United States Patent Office 2,902,379
Patented Sept. 1, 1959

2,902,379

FIBROUS AGGLOMERATE

Louis S. McCollum, North Hollywood, and Sol Gindoff, Los Angeles, Calif., assignors to International Minerals & Chemical Corporation, a corporation of New York No Drawing. Application June 26, 1957
Serial No. 668,029

11 Claims. (Cl. 106—99)

This invention relates to a novel fibrous agglomerate suitable for use in the preparation of plaster and concrete. More particularly, this invention relates to the preparation and composition of an agglomerate of expanded perlite and asbestos.

Crude or raw perlite ore is a volcanic glass having a silica content of about 65 or 70% by weight together with about 12 to 16% alumina, 2 to 5% entrapped water, 7 to 10% alkali metal oxides and small amounts of oxides of iron, calcium and magnesium. A characteristic property of perlite, and of similar volcanic glasses, containing upwards of 2% water is that when such material is expanded in fine particle form to temperatures in the range of about 1500 to 2100° F., softening and rapid expansion or puffing of the particles takes place to produce a cellular expanded product having an extremely low density. Because of its low density, chemical inertness and heat resistency, fully expanded perlite has considerable value as a heat insulation material and for other applications such as lightweight aggregates in plaster, concrete and the like.

In the preparation of plaster or concrete it has been found that when lightweight aggregates of expanded perlite are used to replace denser aggregates, such as sand and gravel, a longer period of time may be necessary to dry the mixture. In addition, the plaster or concrete prepared in this manner may have a lower compression strength than those prepared from sand or gravel aggregates.

It is a primary object of the present invention to overcome disadvantages inherent in the use of expanded perlite as an aggregate in the preparation of plaster and concrete.

It is another object of the invention to provide a method of preparing a novel fibrous agglomerate from perlite and asbestos.

It is another object of the invention to provide a novel fibrous agglomerate of expanded perlite and asbestos.

A further object of the invention is to provide a novel fibrous agglomerate suitable for use in the preparation of plaster and concrete.

Still another object of the invention is to provide a method of preparing plaster and concrete having an improved compression strength, an improved drying rate, and improved thermal insulating properties.

These and other objects and advantages of the invention will be readily apparent from the following detailed description.

Now it has been discovered that fibrous agglomerates comprised of firmly adhering particles of expanded perlite and asbestos may be prepared by heating a mixture of particles of perlite and asbestos to the expansion temperature of perlite, and cooling the resulting agglomerates.

More in detail, perlite ore, or other similar volcanic glass, is mined and crushed in a suitable apparatus such as a jaw crusher to reduce the particle size to less than about 4 mesh. The crushed particles are preferably sized as by screening at about 45 mesh to produce a fraction having a particle size of about −4 +45 mesh, which may be used to prepare the novel agglomerate. The −45 mesh fraction may also be used to prepare the novel agglomerate, but from an economic standpoint, it is desirable to use this fraction in the preparation of a filter air material. The product of the crushing step may also be used without subjecting the particles to a sizing step. However, in order to obtain more uniform expansion of the perlite, it is preferred to use a perlite feed material having a relatively uniform particle size, for example, about −4 +45 mesh.

Perlite particles are mixed with asbestos fibers in a suitable blending apparatus such as a ribbon mixer or the like. Any type of fibrous asbestos may be used, but it is preferred to use an alkaline asbestos containing magnesium compounds in an amount equivalent to between about 35% and about 45% MgO by weight and calcium compounds in an amount equivalent to between about 4% and about 10% CaO by weight. An alkaline asbestos containing compounds of magnesium and calcium compounds in these amounts appear to have a fluxing effect upon perlite during expansion, as described in more detail below. Chrysotile is the type of asbestos preferably used to prepare the novel agglomerate. An approximate chemical analysis of chrysotile is as follows:

| Component: | Approximate Percent by weight |
|---|---|
| $SiO_2$ | 37–44 |
| $MgO$ | 39–44 |
| $FeO$ | 0–6.0 |
| $Fe_2O_3$ | 0.1–5.0 |
| $Al_2O_3$ | 0.2–1.5 |
| $H_2O$ | 12.0–15.0 |
| $CaO$ | Trace–5.0 |

It will be recognized that this is merely an approximate chemical analysis of chrysotile and that the chemical analysis of this material may vary, depending upon its source. In the event that the calcium oxide content of the asbestos is below about 4% by weight, it is desirable to mix finely divided calcium oxide, or other oxygen-containing calcium compound, with the asbestos in an amount to provide between about 4% and about 10% by weight of CaO in the mixture.

Chrysotile is generally found in fiber form. The fibers are flexible and have considerable tensile strength. These fibers usually range in length from less than about ⅛" to about 1", but shorter or longer fibers may be present. A typical screen analysis of chrysotile fibers is as follows.

| Mesh size: | Weight percent |
|---|---|
| +10 | 6.2 |
| −10 +20 | 26.2 |
| −20 +40 | 27.2 |
| −40 +70 | 6.2 |
| −70 +100 | 2.0 |
| −100 | 31.8 |

Asbestos is mixed with the perlite particles in an amount sufficient to provide between about 2% and about 20%, and preferably between about 5% and about 15%, by weight of the mixture. When asbestos is present in an amount less than about 2% by weight, there is insufficient asbestos present in the resulting agglomerates to substantially improve the strength of plaster or concrete prepared from these agglomerates. When asbestos is used in an amount in excess of about 20% by weight of the mixture, a portion of asbestos in the feed may fail to attach to the perlite particles during the expansion step. Unattached asbestos fibers may tend to aggregate and form balls in the expansion furnace or segregate during handling and storage of the agglomerate product. As a result the agglomerate product will lack uniformity of composition, which may be a disadvantage when used in the preparation of plaster and concrete.

If desired, an adhesive material such as an aqueous solution of sodium silicate of about 40° Bé. may be mixed with the perlite ore and asbestos in an amount between about 0.25% and about 1% by weight of the asbestos. Inorganic adhesives such as calcium silicate and organic adhesives such as resins, glue, starch and the like may also be used. Addition of the adhesive material causes the surfaces of the perlite ore and asbestos to become sticky so that they will adhere to each other during the mixing step.

The mixture of perlite particles and asbestos with or without an adhesive is heated in a suitable furnace to a temperature between about 1500° F. and about 2100° F., and preferably between about 1650° F. and about 1850° F. to expand the perlite and to form agglomerates of perlite and asbestos. A gas fired rotating kiln is preferably used to prepare the agglomerates, but other types of furnaces may be used.

In a preferred method of carrying out the expansion step, a rotating kiln having a small downward slope from the feed end is used. A mixture of air and a gaseous fuel such as natural gas is burned in a suitable chamber which communicates with the feed end of the kiln. The flame temperature is sufficiently high to produce combustion gases having a temperature of the order of about 2100 to 2700° F. Higher or lower temperatures may be used, depending upon the composition of the perlite. Combustion gases pass from the flame at the feed end to the discharge end of the kiln.

The mixture of particles of perlite and asbestos are conveyed by a suitable conduit from the blending apparatus to the top of the feed end of the kiln. The mixture is fed to the kiln by means of a suitable distributor at the top of the kiln as a free falling band or layer of solids. This band of solids is substantially perpendicular to the direction of flow of combustion gases in the kiln. The band of solids is positioned adjacent to the tip of the flame, at a distance of between about 6″ to 12″, as measured along the central axis of the kiln.

As the free-falling solids pass downwardly through the combustion gases, the temperature of the solids increases rapidly. At temperatures near about 1500° F., the perlite particles become semi-fluid and expand due to the internal pressure in the particles caused by the volatilization and release of the entrapped water normally contained therein. While the perlite particles are in this semi-fluid state, asbestos fibers adhere to and are embedded in the surface of the perlite particles. It is believed that when magnesium and calcium compounds are present in the asbestos in the amounts specified above, these compounds have a fluxing effect upon the surface of the perlite particles. Therefore, the perlite particles are in a semi-fluid state for a longer period than they would be if expanded in the absence of asbestos, thus increasing the surface area of perlite available for contact with asbestos fibers during the expansion step. As a result, the degree of adhesion and agglomeration between the asbestos fibers and perlite particles is increased.

Agglomerates of semi-fluid expanded perlite particles having asbestos fibers adhering to the surfaces pass to the bottom of the kiln, where the temperature is substantially lower than the temperature adjacent to the combustion zone. The temperature of the agglomerates is thereby reduced, causing solidification of the semi-fluid expanded perlite particles. Solidification of perlite has a cementing effect upon asbestos fibers attached to the surface of the perlite particles, which causes the formation of agglomerates of firmly adhering particles of expanded perlite and asbestos. The solidified agglomerates are conveyed to the discharge end of the kiln and fed to a collecting hopper. A suitable air blower conveys the kiln product from the collecting hopper to a cyclone separator where fine particles of expanded perlite and unattached asbestos having a particle size less than about 100 mesh are separated from the agglomerates. The mixture of expanded perlite fines and fine unattached asbestos fibers, which passes out of the top portion of the cyclone separator, is collected and stored for use as a filter aid material. Fibrous agglomerates, which have been cooled in the cyclone separator, are removed from the apex of the cyclone separator and conveyed to storage.

Fibrous agglomerates may also be prepared by feeding perlite and asbestos into the kiln through separate and adjacent distributors positioned at the top of the feed end of the kiln. In this embodiment of the invention, mixing of perlite and asbestos is accomplished within the kiln. However, best results from the standpoint of attachment of asbestos fibers to the perlite particles are obtained when asbestos and perlite are mixed prior to feeding to the kiln, as described above in the preferred embodiment.

Fibrous agglomerates of expanded perlite and asbestos prepared in accordance with the novel method have several advantages over conventional expanded perlite aggregates when used as a component of plaster and concrete. When novel fibrous agglomerates are used to prepare plaster and concrete, the water necessary to prepare the mixture may be reduced by as much as 15% without having any adverse effect upon the workability or slump of the material. Therefore, plaster and concrete containing novel fibrous agglomerates dry in substantially less time than when conventional expanded perlite aggregates are used. In addition, when novel fibrous agglomerates are used to prepare plaster or concrete, the dry plaster or concrete product has a higher compression strength than plaster or concrete prepared from expanded perlite aggregates. Furthermore, plaster prepared from the novel fibrous agglomerates has a lower coefficient of thermal conductivity than plaster prepared from conventional expanded perlite aggregates. As a result, plaster prepared from the novel fibrous agglomerates has improved insulating properties. Novel fibrous agglomerates may also be used as a loose fill insulation material, and as a component of insulating blocks and boards.

As illustrative of the character of the instant invention, but in nowise intending to be limited thereby, the following examples are described.

*Example 1*

Perlite ore mined in the vicinity of Fish Springs, California, was crushed to about −16 mesh and heated to dryness at a temperature of about 120° C. in a rotary dryer. Dryer product was screened at about 45 mesh. The −45 mesh ore was stored and used for the preparation of filter aid material and the like. The −16 +45 mesh perlite was mixed with chrysotile in a weight ratio of about 90 parts perlite to 10 parts of chrysotile. Approximate chemical analysis of chrysotile was as follows.

| Component: | Percent by weight |
|---|---|
| $SiO_2$ | 41.0 |
| $MgO$ | 37.4 |
| $FeO$ | 0.5 |
| $Fe_2O_3$ | 0.4 |
| $Al_2O_3$ | 0.5 |
| $H_2O$ | 15.0 |
| $CaO$ | 5.0 |

Approximate screen analysis of chrysotile was as follows.

| Mesh size: | Percent by weight |
|---|---|
| +10 | 6.2 |
| −10 +20 | 26.0 |
| −20 +40 | 27.2 |
| −40 +70 | 6.2 |
| −70 +100 | 2.0 |
| −100 | 31.8 |

A rotating kiln constructed of mild steel lined with fire brick was used to prepare the agglomerates. The kiln was about 14 feet long with a diameter of about 2 feet, and sloped downwardly from the feed end at an angle of about 3 degrees from the horizontal. The kiln was rotated at about 43 revolutions per minute. Combustion gases produced by burning an air-natural gas mixture was introduced into the feed end of the kiln. The temperature of the combustion gases when entering the kiln was about 2100° F.

The mixture of perlite and asbestos was introduced at the top of the kiln at the feed end as a thin vertical band of solids perpendicular to the direction of gas flow. The mixture of solids was fed to the kiln at the rate of about 1000 pounds per hour. The layer of solids was positioned about 8" from the tip of the flame, as measured along the central axis of the kiln. Fibrous agglomerates were discharged from the kiln into a collection hopper. Agglomerates were removed from the hopper and introduced into the suction side of an air blower and conveyed to a cyclone separator. Fine particles from the top of the cyclone separator were stored for use as a filter aid. Fibrous agglomerates collected from the apex of the cyclone were conveyed to a storage hopper. The temperature of the fibrous agglomerates from the cyclone was about 175° F. About 925 pounds per hour of fibrous agglomerates were produced.

Portions A and B of the novel fibrous agglomerates were separated from the cooled cyclone product. Portion A was mixed with gypsum plaster in an amount equivalent to about 2½ volumes of agglomerates for each volume of gypsum plaster. Sufficient water was added to the mixture to give a plastering consistency. The quantity of water necessary to accomplish this was found to be equivalent to about 20.25 gallons per 100 lbs. of plaster. A portion of the mixture was placed into three cylinders, each having a diameter of about 2", and was allowed to dry. Three plaster cylinders, each having a diameter of about 2" and a height of about 4" were produced. Compression strength of these cylinders, as determined by the method of The American Society of Testing Materials, Designation C-28-55, was found to be about 172, 178, and 178 pounds per square inch, respectively. The average compression strength of the cylinders was about 176 pounds per square inch.

*Example 2*

For purposes of comparison, perlite particles having a particle size between about −16 +45 mesh were expanded in the same manner as the perlite particles of Example 1 with the exception that no asbestos fibers were mixed with the perlite particles. Expanded perlite aggregates produced in this manner were used to prepare three plaster cylinders as described in Example 1. It was found that about 23.75 gallons of water per 100 lbs. of plaster was necessary to produce a mixture having a plastering consistency. Compression strength of the three dry plaster cylinders was found to be about 89, 92, and 105 lbs. per square inch, respectively, as determined in accordance with the method of The American Society for Testing Materials, Designation C-28-55. The average compression strength of the three cylinders was about 95 pounds per square inch. Thus, it can be seen that when novel fibrous agglomerates are used in the preparation of plaster, about 14% less water is necessary to obtain a mixture having a plastering consistency. Furthermore, the dry plaster of Example 1 had a compression strength that was almost twice that of plaster prepared from conventional expanded perlite aggregates.

*Example 3*

Portion B of Example 1 was mixed with cement in an amount equivalent to 3 volumes of fibrous agglomerates for each volume of cement. About 11.1 gallons of water was added per sack of cement. A portion of the mixture was placed in three 2" diameter cylinders and allowed to dry. Three concrete cylinders, each having a diameter of about 2" and a height of about 4" were produced. The compression strength of these cylinders, as determined in accordance with the method of The American Society for Testing Materials, Designation C-39-49 was found, after 7 days' curing, to be about 510, 445, and 480 pounds per square inch respectively. The average compression strength of the cylinders was about 478 p.s.i.

*Example 4*

For purposes of comparison, three cement cylinders were prepared in accordance with the method of Example 3 with the exception that conventional expanded perlite aggregates of Example 2 were used instead of novel fibrous agglomerates. About 13.3 gallons of water per sack of cement was necessary to obtain a mixture having a consistency of the mixture in Example 3. Compression strength of the concrete cylinders, after 7 days' curing, was found to be about 380, 395, and 370 pounds per square inch, respectively, as determined in accordance with the method of The American Society for Testing Materials, Designation C-39-49. The average compression strength of the cylinders was about 381 p.s.i. It can be seen that the use of novel fibrous agglomerates in the preparation of concrete of Example 3 required about 16% less water than when conventional expanded perlite aggregates were used. In addition, there was an improvement of about 26% in the compression strength of the dry concrete when the novel fibrous agglomerates were used.

Having now thus fully described and illustrated this invention, what is desired to be secured by Letters Patent is:

1. An agglomerate comprised of firmly adhering particles of expanded perlite and asbestos, wherein said asbestos is embedded in the outer surface of said expanded perlite, and wherein the proportion of said asbestos in said agglomerate is between about 2% and about 20% of the total weight of asbestos and expanded perlite.

2. The agglomerate of claim 1 wherein the asbestos is chrysotile.

3. Concrete containing fibrous agglomerates comprised of firmly adhering particles of expanded perlite and asbestos, wherein said asbestos is embedded in the outer surfaces of said expanded perlite, and wherein the proportion of said asbestos in said agglomerates is between about 2% and about 20% of the total weight of asbestos and expanded perlite.

4. Plaster containing fibrous agglomerates comprised of firmly adhering particles of expanded perlite and asbestos, wherein said asbestos is embedded in the outer surface of said expanded perlite, and wherein the proportion of said asbestos in said agglomerates is between about 2% and about 20% of the total weight of asbestos and expanded perlite.

5. The method of preparing agglomerates of firmly adhering particles of expanded perlite and asbestos which comprises the steps of heating a mixture of particles of perlite and asbestos to a temperature sufficiently high to soften and expand said perlite, wherein the proportion of said asbestos in said mixture is between about 2% and about 20% of the total weight of asbestos and perlite, whereby agglomerates are formed, and cooling said agglomerates.

6. The method of claim 5 wherein the mixture of perlite and asbestos is heated to a temperature of between about 1500 and about 2100° F.

7. The method of claim 5 wherein the mixture of perlite and asbestos is heated to a temperature of between about 1650 and 1850° F.

8. The method of claim 5 wherein the asbestos is chrysotile.

9. The method of claim 5 wherein the asbestos contains magnesium compounds in an amount equivalent to between about 35% and 45% magnesium oxide by weight, and calcium compounds in an amount equivalent to between about 4% and 10% calcium oxide by weight.

10. The method of preparing agglomerates of firmly adhering particles of expanded perlite and asbestos which comprises the steps of mixing particles of perlite and asbestos to obtain a substantially homogeneous mixture wherein the proportion of said asbestos in said mixture is between about 2% and about 20% of the total weight of asbestos and perlite, heating the mixture to a temperature sufficiently high to soften and expand said perlite whereby agglomerates are formed, and cooling said agglomerates.

11. The method of preparing agglomerates of firmly adhering particles of expanded perlite and asbestos which comprises the steps of mixing perlite particles, asbestos fibers and an adhesive to obtain a substantially homogeneous mixture wherein the proportion of said asbestos in said mixture is between about 2% and about 20% of the total weight of asbestos and perlite, heating the mixture to a temperature sufficiently high to soften and expand said perlite, whereby agglomerates are formed, and cooling said agglomerates.

References Cited in the file of this patent

UNITED STATES PATENTS

| | | |
|---|---|---|
| 2,459,685 | Cummins | Jan. 18, 1949 |
| 2,565,340 | Anderson | Aug. 21, 1951 |
| 2,585,366 | Bollart et al. | Feb. 12, 1952 |
| 2,634,207 | Miscall et al. | Apr. 7, 1953 |